(12) United States Patent
Apostolescu et al.

(10) Patent No.: US 9,111,092 B2
(45) Date of Patent: Aug. 18, 2015

(54) SECURITY EVENT MANAGEMENT APPARATUS, SYSTEMS, AND METHODS

(75) Inventors: Paul Apostolescu, Ashburn, VA (US); John Melvin Antony, Herndon, VA (US); Pattabiraman Srinivasan, North Potomac, MD (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 13/219,871

(22) Filed: Aug. 29, 2011

(65) Prior Publication Data

US 2013/0055339 A1     Feb. 28, 2013

(51) Int. Cl.
*G06F 21/55*     (2013.01)
*H04L 29/06*     (2006.01)
*G06F 21/57*     (2013.01)

(52) U.S. Cl.
CPC ............ *G06F 21/554* (2013.01); *G06F 21/577* (2013.01); *H04L 63/1408* (2013.01); *H04L 63/1416* (2013.01); *H04L 63/20* (2013.01)

(58) Field of Classification Search
CPC .............. H04L 63/14; H04L 29/06891; H04L 29/06884; H04L 29/06877; H04L 63/20; H04L 63/145; H04L 63/1425; H04L 63/1408
USPC .............. 709/245; 717/107; 726/1, 22, 23, 25
See application file for complete search history.

(56) References Cited

U.S. PATENT DOCUMENTS 7,472,422 B1 * 12/2008 Agbabian ...................... 726/25
8,510,827 B1 *  8/2013 Leake et al. ................... 726/22

2008/0216175 A1    9/2008 Pike
2009/0328210 A1 * 12/2009 Khachaturov et al. .......... 726/22
2010/0083379 A1    4/2010 Katsunuma et al.

FOREIGN PATENT DOCUMENTS

WO    WO-2009091487 A2    7/2009

OTHER PUBLICATIONS

Kerzhner et al., Taint Propagation in a Network.*
Kerzhner, Grigoriy, et al., "Taint Propagation in a Network", http://digital.cs.usu.edu/~xqi/Teaching/REU09/Website/Greg/FinalPaper.pdf, Department of Computer Science, Utah State University, (No date listed), 11 pgs.
Venkataramani, Guru, et al., "FlexiTaint: A Programmable Accelerator for Dynamic Taint Propagation", IEEE 14th International Symposium on High Performance Computer Architecture, 2008. HPCA 2008., (2008), 173-184.

* cited by examiner

*Primary Examiner* — Andrew Nalven
*Assistant Examiner* — Huan V Doan
(74) *Attorney, Agent, or Firm* — Schwegman Lundberg & Woessner, P.A.

(57) ABSTRACT

Apparatus, systems, and methods may operate to include transforming subsequent unmarked contexts into additional tainted contexts in response to identifying a tainted event as a link between a prior tainted context and the subsequent unmarked contexts. Further operations may include publishing an event horizon to a display. The event horizon may include the tainted event and all other events associated with a linked chain of contexts that include the prior tainted context and the additional tainted contexts, where the tainted event and the other events share the taint in common. In this way, a taint associated with malicious behavior can be propagated and tracked as it moves between contexts. Additional apparatus, systems, and methods are disclosed.

19 Claims, 4 Drawing Sheets

SECURITY EVENT MANAGEMENT APPARATUS, SYSTEMS, AND METHODS

BACKGROUND

There are been a dramatic rise in investment and interest in the Security Event Management (SEM) space. Fueled by an increasing number of cyber attacks and various compliance regulations, computer and network security practitioners use SEM tools to analyze huge volumes of logged security event data to identify threats in real time. These SEM tools have evolved from mechanisms that collect, normalize, store, index and report log data to more intelligent systems that operate using rule-based correlation engines to analyze enriched event data (e.g., using identity injection, asset relevance injection, etc.) in real time to identify potential violations of compliance and security policies. In some cases, a great deal of reliance is placed on these correlation engines to ensure that security policies have not been violated.

SUMMARY

In various embodiments, apparatus, systems, and methods that support security event management are provided. In some cases, the operations include receiving an indication that the context associated with an event source is malicious, and generating a context taint to identify the context as malicious when the context has not been previously known to be malicious. Further operations may include transforming the event from an unmarked event to a tainted event by marking the unmarked event with the context taint, and marking any subsequent context linked to the context by the tainted event or other events, as a tainted context, so as to propagate the taint between the tainted context and other tainted contexts.

In some embodiments, operations include transforming subsequent unmarked contexts into additional tainted contexts in response to identifying a tainted event as a link between a prior tainted context and the subsequent unmarked contexts. Further operations may include publishing an event horizon to a display, where the event horizon includes the tainted event and other events associated with a linked chain of contexts that include the prior tainted context and the additional tainted contexts, where the tainted event and the other events have a taint in common. Additional embodiments are described, and along with the foregoing examples, will be set forth in detail below.

DETAILED DESCRIPTION

One of the main challenges faced by users of SEM products is to detect malicious incursions and alert in real time, to prevent occurrence of a successful attack. The current state of the art for malicious activity detection in SEM products uses rule-based correlation engines with a priori knowledge of malicious event sequences. Thus, rules are created to match the sequences. When activity is detected that matches a rule, then an alert occurs. Because these operations are reactive, there is always a gap in time between the discovery of a new attack pattern and the creation of a rule to detect it. During that time, the system is open to zero day (not-yet-public) attacks, which leads system managers down the path of continuously patching and updating rule sets.

Often, the target of the attack is not directly accessible to the outside world. Rather, it is located behind several layers of defense (e.g., firewalls, demilitarized zones, etc.) so a successful attack will involve actions/connections across multiple machines/assets: desktop computers, web servers, databases, etc. To be able to detect such attacks, it is useful to trace causal relationships between events. Unfortunately, due to the high volume of events, diversity and disconnect between sources are hard to compute and analyze.

Conventional systems taint or mark system data, and propagate the taint based on derived data. However, observing the manifestations of actions (e.g., events stored in logs) over a number of potential sources makes it non-trivial to generically verify security statements concerning seemingly innocuous actions, such as a user changing an access policy. The inventors have discovered that tainting an event, rather than data, and then propagating the taint based on the event context, provides several advantages. These will now be described.

Conventional data-based tainting (e.g., tainting an email attachment) can miss attacks that are used across an enterprise. For example, when an attack spans a firewall, a web server, an ssh (secure shell) session, and a CRM (customer relations management) system, no data is transferred from the firewall to the CRM system. Only the active connections link the attacker to the CRM system. This is because data-based tainting relies on tainted data being transferred between systems. As a matter of contrast, the context-based tainting described herein detects attacks based on the fact that one infected connection initiates another—so the type or amount of data transferred between assets is irrelevant.

In other words, the approach described herein does not propagate taints based on data, but on the actions themselves (e.g., tainting the action of downloading an email attachment), which are manifested as events. An attack that spans a firewall, a web server, an ssh session, and a CRM system, for example, will be detected because the connections that are made will be tainted as events, and the taint will thus flow across the connections.

Tainting derived data (e.g., tainting the unzipped file when an attachment is unzipped) in conventional systems can miss attacks where the data is not transferred, whereas propagating the taint between actions based on the context in which the action takes place does not. Moreover, derived data tainting will not detect fan out scenarios, where the attacker controls a machine that accesses other machines. However, context-based tainting will flow the taint to other actions, because they are linked by the same initiator context. In short, conventional systems are often unable to track attack causality across multiple systems and heterogenous event sources without expending significant effort to encode each situation as a special rule, such as the interactions between systems.

For example, consider a two hop connection (e.g., attacker operates to "VPN into" a server, which uses a "ssh into" the CRM system). Here, no data is transferred, and the attack will be missed if derived data tainting is used. However, the attack will be detected if the taint is propagated across actions based on the action context: if the "VPN into" is tainted as an action, and the "ssh into" is initiated from the same [machine, user session] combination, then the "ssh into" action becomes tainted as well.

To address some of these issues, as well as others, SEM can be implemented to track malicious activity in real time, using taint tracking and propagation between contexts. This can be accomplished using a process of: tainting events triggered by untrusted sources, propagating the taint to events created in the same context as they flow through the system, and using the taint to verify security statements in a real time analysis engine.

For the purposes of this document, a "taint" is defined as a value (e.g., numeric, character, alphanumeric, etc.) that can be stored in a memory and that is used to mark an original context, an original event associated with the context, and any context or event that is subsequently linked to the original marked context or the original marked event. Typically, taints are used to mark events or contexts that are determined to be malicious.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments that can be realized.

Figure 1:
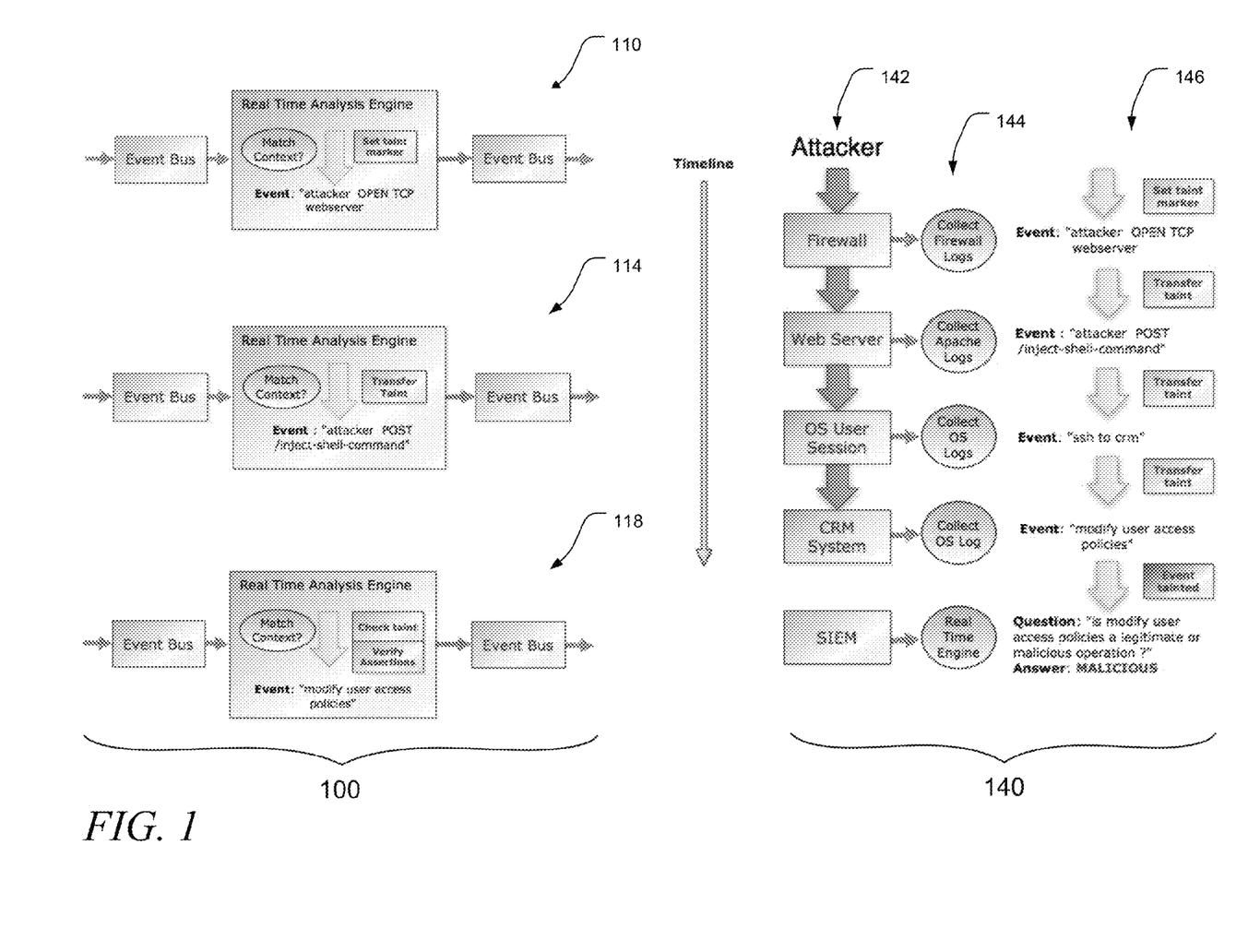
FIG. 1 is a set of system block diagrams that illustrate how taints are propagated between contexts according to various embodiments of the invention.

FIG. 1 is a set of system block diagrams 100, 140 that illustrate how taints are propagated between contexts according to various embodiments of the invention.

An event is associated with a taint if the source context of the event is tainted. For the purposes of this document, an "event" is an action that can be monitored and recorded within an operational computer system. An event is often associated with more than one context, serving to link multiple contexts. Examples of events include "receiving an email message", or "logging into a www.amazon.com user account". Events can be used as a vehicle to create a relationship between event contexts.

For the purposes of this document, an event "context" is defined as the environment surrounding an interaction between the event and one or more functions provided by an application at a particular point in time. For example, a context C1 might include a Windows® Operating System (OS) session on a laptop computer associated with an Internet Protocol (IP) address of 192.168.1.1, and owned by user "Admin" at 1/1/2011 10:00:01 AM UTC. Context C2 might include an email forwarding application, operating on a virtual server at 1/1/2011 10:00:02 AM UTC.

For example, let context C1 be the Windows® Operating System (OS) session running on a desktop computer with an Internet Protocol (IP) address of 192.168.1.1, owned by user Admin at 1/1/2011 10:00:01 AM UTC. In this case, context C1 is an environment defined by accessing functions provided by an application at a particular point in time.

Next, let event E be an email connection that is made from context C1 to an email server identified as context C2, which identifies the email server machine at 1/1/2011 10:00:01 AM UTC. If context C1 is tainted, then context C2 becomes tainted by propagating the taint between contexts, according to the various embodiments described herein.

For the purposes of this document, the "event horizon" of an event E comprises all events that have been triggered during a selected time frame from an event source context (that was tainted by event E). This often means the event horizon comprises all events sharing a common taint that act on a linked chain of contexts.

As an example, let context C1 be the Windows® OS session on a computer with an IP address of 192.168.1.1, owned by user Admin at 1/1/2011 10:00:01 AM UTC. Then let event E be an FTP (File Transfer Protocol) connection from context C1 to an FTP server identified as context C2, which identifies the FTP server machine at 1/1/2011 10:00:01 AM UTC.

If context C1 was tainted, then C2 becomes tainted according to various embodiments described herein, and the event horizon of event E comprises all events originating from context C2 during some selected time period (e.g., the next hour). Thus, if at 10:59:59 AM UTC an event F is triggered from context C2, then event F becomes tainted and also becomes part of the event horizon of event E.

For the purposes of this document, a "security assertion" is an operation used to verify that an event is not the result of a malicious operation. For example, a security assertion might operate according to one or more rules (e.g., when an event is received and the target of the event is an email server, verify that the event is not tainted).

The process of tainting events, propagating taints, and using taints to verify security statements will now be described.

Taint identifications are created for events when a taint enters the monitored system for the first time, for example, when an event is triggered by IP addresses that are not trusted. Thus, when an intrusion detection system (IDS) or apparatus collects events from an untrusted source, a taint marker is attached in real time to the events based on the event context. An example of this activity 110 can be seen in FIG. 1.

Whether an event source is trusted can be determined either statically or dynamically. Static determination of trust uses a priori knowledge about the associated network topology and/or enterprise structure. For example, it may be determined that "all IP addresses that are not in my network are not trusted."

Dynamic determination of trust uses information gathered at runtime to perform the evaluation. For example, it may be determined that "when the IDS detects an attack on address 192.168.1.1 then address 192.168.1.1 is no longer trusted."

As noted previously, an example of an event might be "logging into a www.amazon.com user account". In this case, two associated contexts might be: (C1) the machine used to login to the account, the validated user, and the time of login, and (C2) the amazon.com account, the login time, and the username/password used to login. Thus, the event serves as a bridge between contexts C1 and C2.

In some embodiments, a context matching component operates to detect this bridge using tainted events as input to a customizable algorithm that classifies events based on one or more of the event source, the event initiator, the target, the asset, the identity, the time, and other explicit or implied information about the event. The event source, such as a firewall, is the source of the event. The event initiator is the entity that initiates an action that triggers the appearance of the event. Thus, a machine requesting a connection through the firewall (as the event source) would be the event initiator in that case.

To further the example, assume the Windows® OS session used to login to www.amazon.com has been compromised by a virus. The first context C1 has the taint identification attached to it. This taint is added to the connected context of the www.amazon.com login session because an event occurs (e.g., login) that links the two contexts. The taint is attached to the Windows® OS session by first generating a unique taint identification (e.g., a universally unique identifier (UUID)) or record, such as UUID=ABC, then storing the taint identification, and finally, by attaching the taint identification to all events associated with the original context C1. The taint identification ABC in this case is passed on to all linked contexts (e.g., context C2). The taint identification ABC remains with the chain of tainted contexts (C2, C3, . . . , CN), even if the original context C1 is destroyed or disappears.

As another example, let context C1 be the event source context identified by the Windows® OS session for the user "Administrator" on a machine identified by the IP address 192.168.1.1 at 1/1/2011 10:00:00 AM UTC. Let context C2 be the event context identified by the web application "Salesforce" on the machine identified by the IP address 192.168.1.2 at 1/1/2011 10:00:00 AM UTC. And let event E be the event created when the user "Administrator" logs into the web site to execute "Salesforce". If context C1 is not tainted, then context C2 will not be tainted. However, if context C1 is tainted (e.g., the session was opened from an external IP address, or the IDS has flagged a successful attack on IP address 192.168.1.1), then context C2 becomes tainted, indicating a possible security breach.

As more events flow through the IDS or apparatus, each context is examined to determine whether any associated event links that context to any previously tainted context, and if so (e.g., there is a tainted event associated with the examined context), the appropriate taints are propagated to that context, so that any events emanating from that context will also be tainted. An example of this activity 114 can be seen in FIG. 1.

For example, assume context C1 has a taint identified by a UUID="55040123-1234-1234-1234-986236475829". Then an event E associated with context C1 as its source will also have the taint "55040123-1234-1234-1234-986236475829". If C2 is a target of event E, then C2 will also receive the taint "55040123-1234-1234-1234-986236475829". To minimize the amount of data that is communicated between contexts in some embodiments, the taint of event E is set to be "55040123-1234-1234-1234-986236475829"; the event E does not receive any other taint identification, so it is therefore not linked directly to the event that tainted context C1.

In some embodiments, a taint checking engine monitors machines, connections, and other contexts in real time for the appearance of tainted events. When a tainted event is discovered, the engine determines whether the event context matches any security assertions. If there is a match, the assertions are verified. An example of this activity 118 is shown in FIG. 1.

The tainting of a context is often associated with a configurable time frame. For example, a taint may be applied to a context C2 that has been linked to context C1 by a tainted event during some specified interval of time (e.g., an hour after context C1 acquires the taint). Or the taint may be applied to subsequent linked contexts (e.g., contexts C2, C3, C4, . . . , CN) until application of the taint is manually halted by a system administrator. Allowing the taint application duration to be configurable benefits forensic investigations in many instances because the event horizon can be used to determine how far the influence of a successful attack may have reached.

Thus, events are not linked—they are tainted based on the event source context, and serve as a link between contexts. In many embodiments, a policy determines whether an original taint will be created. Therefore, a taint is passed to an event based on the event source context, and the event source context taint can be set by using: explicit predefined rules (e.g., using static trust information), implied dynamic information provided by an IDS or other systems (e.g., using dynamic trust information), or by detecting when a context interacts with an event that is already tainted.

Diagram 140 illustrates an example embodiment of the process where taint markers are applied when the action flow enters the monitored system from an untrusted source, wherein the taint is transferred to propagate across connection hops, and finally, when the taint is used to check security assertions. Here, a possible attack sequence to gain access to the CRM system is shown. The diagram 140 is organized according to columns (top to bottom) and rows (left to right).

The first column 142 represents the system "hops", which are the applications/systems where activity takes place. The second column 144 represents the audit data for each application/system collected by an SEM product. The third column 146 represents the action taken by the SEM product when it collects a particular event (e.g., taint, taint transfer, and verify assertions).

The "Attacker" row represents the external entity that tries to gain access to the CRM system. The "Firewall" row represents the first defense to be penetrated by the Attacker. The "Web Server" row represents the second target of the Attacker (the Firewall is the first). If the Web Server attack succeeds, then the process proceeds to the "OS User Session" row. Here, the user session is controlled by the attacker on the web server if the shell command injection succeeds. From there, the Attacker can access the "CRM System" row, which represents the ultimate attack target and final hop. Here the Attacker can engage in whatever malicious operations it is designed to produce. By linking the tainted contexts, attacks such as this may be halted prior to the Attacker accessing the CRM system, and perhaps, even the Web Server. Thus, many additional embodiments may be realized.

Figure 2:
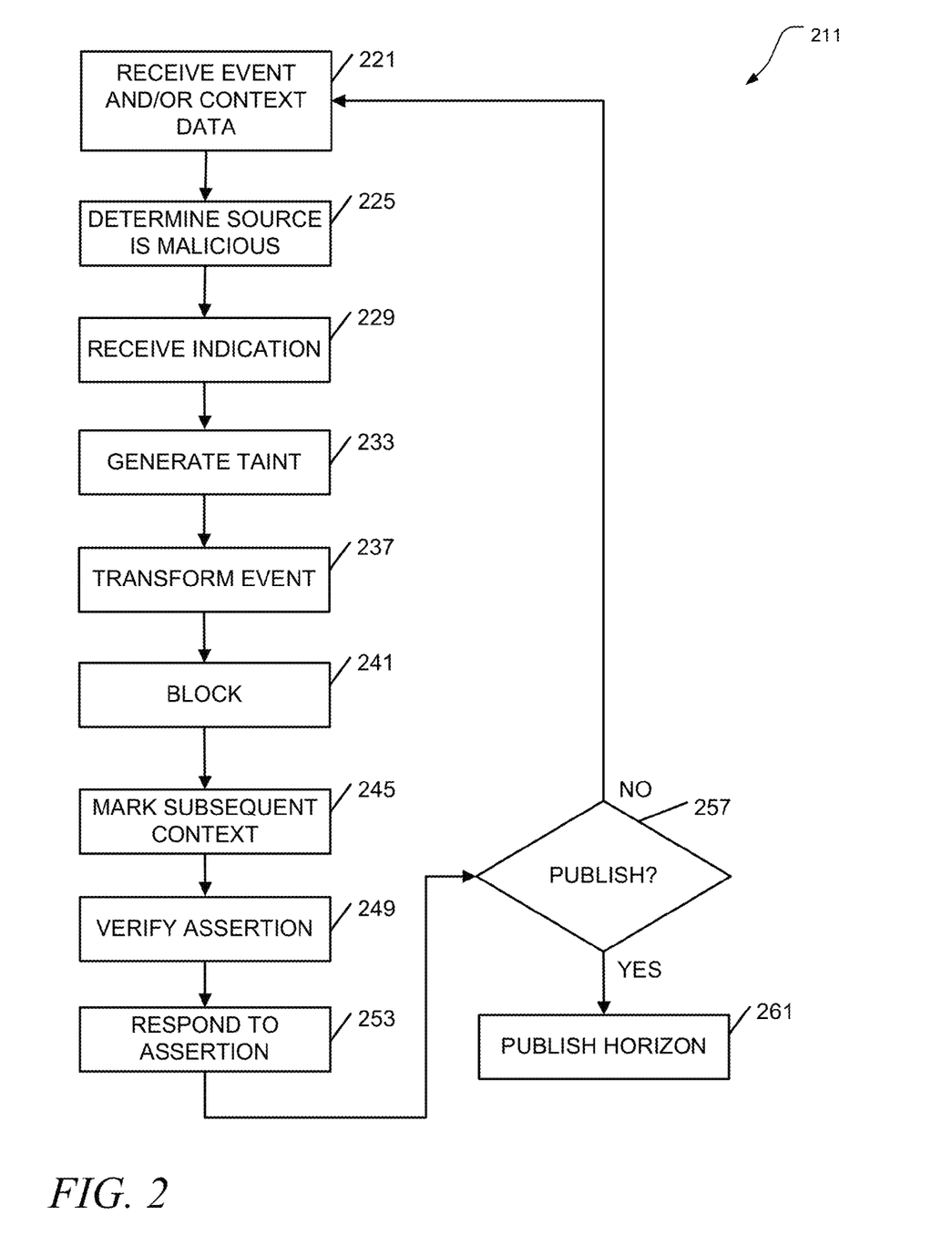
FIG. 2 is a flow diagram illustrating methods of operation according to various embodiments of the invention.

For example, FIG. 2 is a flow diagram illustrating methods 211 of operation according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when executed by a specific machine, operate to perform the processing depicted in FIG. 2.

Some embodiments include discovering an event emanating from a malicious source, and propagating a taint by tainting the event, the original context associated with the event, and any subsequent context that is linked to the original context by the event itself, or any other event. The other events linked to tainted contexts can also be tainted.

Thus, a method 211 may begin at block 221 with receiving data regarding an event or an event context. The method 211 may continue on to block 225 with determining whether the source of the event, or an event that links the event context to a prior context, is malicious.

The determination can be a static determination. Thus, the activity at block 225 may comprise determining that the source is malicious by matching static characteristics of the source with information in a policy defining malicious sources, the policy being established prior to existence of the event.

The determination may be a dynamic determination. Thus, the activity at block 225 may comprise determining that the source is malicious by matching malicious activity defined in a policy with activity presented by the source.

The result of the determination at block 225 may be that the context associated with a particular event is malicious. An indication that reflects this determination may be generated. Thus, the method 211 may continue on to block 229 with receiving an indication that a context associated with the source of an event is malicious.

Applications, such as a virus scanner, can also indicate the existence of an event associated with a malicious source. Other examples of such applications include: IDS products, IPS (intrusion prevention system) products (including antivirus products), public and/or private blacklists, and databases containing reputation data, such as Web of Trust (e.g., http://www.mywot.com/). Thus, for example, the activity at block 229 may comprise receiving the indication as a message from a software application, with respect to the source being another application compromised by a software virus.

The method 211 may continue on to block 233 with generating a taint for an event, or a context. The context taint can be used to identify the context as malicious when the context has not been previously known to be malicious.

A tainted event is created by marking an unmarked event with a taint when the unmarked event is generated by an identified malicious source (e.g., an untrusted source). The taint that is subsequently propagated between contexts may comprise a QUID. Thus, the activity at block 233 may comprise creating a taint to include a QUID value.

The method 211 may continue on to block 237 with transforming an event from an unmarked event to a tainted event by marking the unmarked event with the (previously generated) context taint. The taint may travel with the original tainted event, and with other events that link tainted contexts. Thus, the activity at block 237 may comprise applying the taint as a value that travels with the tainted event.

Tainted events can be blocked prior to interacting with a selected context. Thus, the method 211 may continue on to block 241 with blocking interaction of an event with a new context when the event is marked by a taint.

The method 211 may continue on to block 245 with marking any subsequent context linked to the (previously tainted) context by a tainted event or other events, as a tainted context, so as to propagate the taint between the tainted context and other tainted contexts.

The taint is not processed as data by contexts, but is associated with tainted contexts when they are linked by a tainted event. Thus the activity at block 245 may comprise applying the taint as a value that is associated with the context and the subsequent context, wherein the taint is not data to be processed within the context or the subsequent context. In some embodiments, the activity at block 245 may comprise transforming subsequent unmarked contexts into additional tainted contexts in response to identifying a tainted event as a link between a prior tainted context and the subsequent unmarked contexts Propagation of the taint can be time-limited. Thus, the activity at block 245 may comprise transforming the subsequent unmarked contexts into the additional tainted contexts for a time period that ends when an indication of manual termination is received, or in accordance with a period defined by a self-terminating configuration value.

In many embodiments, information regarding potential security breaches can flow across heterogeneous systems, without encoding interactions between the systems as rules. Thus, the activity at block 245 may comprise transforming subsequent unmarked contexts into the additional tainted contexts across multiple computer systems without accessing a set of rules defining interactions between the multiple computer systems.

The legitimacy of a security assertion coinciding with a tainted context can be verified, comprising one of the more useful endpoint uses of the tainting mechanism: to make decisions about the security posture of the individual user. Thus, the method 211 may continue on to block 249 to include verifying security assertions from user defined policies associated with a prior tainted context or additional tainted contexts (linked to the prior tainted context).

Taint propagation can be tracked, and the approach to specific destinations can be monitored. Thus, the activity at block 249 may comprise determining whether the taint applied to a tainted event is traveling toward a forbidden destination, or that the taint has reached the forbidden destination.

In some embodiments, virus severity can be determined by whether there is an associated taint. Conversely, the kind of taint can also be used to determine the severity of the attack. Thus, some events are only notified, whereas others are alarmed, or quarantined. The severity of the security assertion can be graded according to context vulnerability categories. Thus, the method 211 may continue on to block 253 by responding to one or more security assertions according to a vulnerability category associated with one or more corresponding tainted contexts.

In some embodiments, taints are propagated between contexts, and an event horizon is published. Thus, the method 211 may include, at block 257, determining whether publication of an event horizon is desired. If not, the method 211 may return to block 221. If so, the method 211 may continue on to block 261 to include publishing an event horizon to a display. The event horizon may include the original tainted event and all other events associated with a linked chain of contexts that include a prior tainted context and additional tainted contexts, the tainted event and the other events sharing a taint in common.

The methods described herein do not have to be executed in the order described, or in any particular order. Moreover, various activities described with respect to the methods identified herein can be executed in repetitive, serial, or parallel fashion. The individual activities illustrated using FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The activities shown in FIGS. 1 and 2 can be implemented in various devices, as well as in a computer-readable storage medium, where the methods are adapted to be executed by one or more processors. Further details of such embodiments will now be described.

Figure 3:
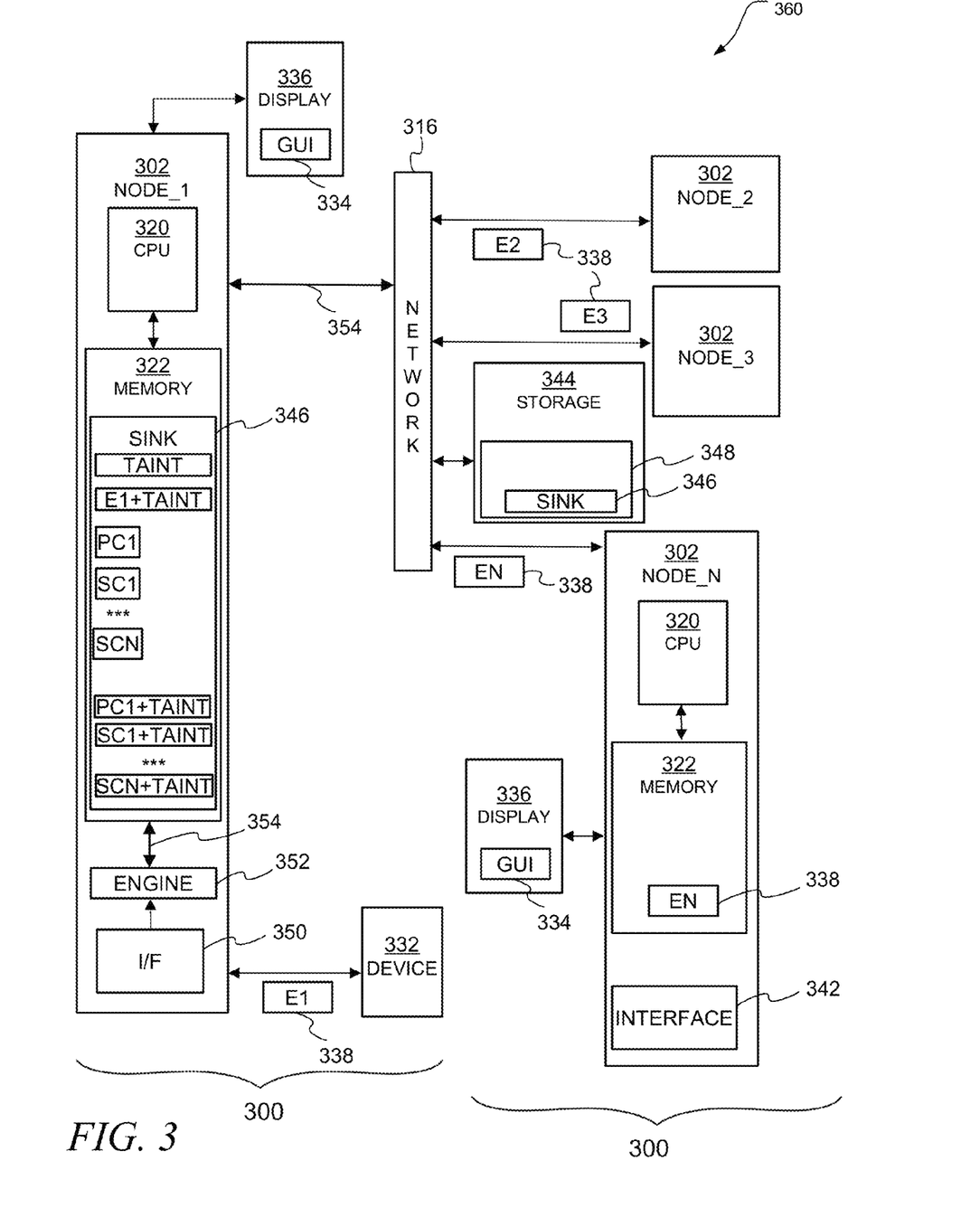
FIG. 3 is a block diagram of apparatus and systems according to various embodiments of the invention.

FIG. 3 is a block diagram of apparatus 300 and systems according to various embodiments of the invention. Here it can be seen that an apparatus 300 used to provide SEM may comprise one or more processing nodes 302, one or more processors 320, multiple memories 322, and/or displays 336. The apparatus 300 may comprise a client, a server, or some other networked processing node.

The processing nodes 302 may comprise physical machines or virtual machines, or a mixture of both. The nodes 302 may also comprise networked entities, such as servers and/or clients. In some basic implementations, the operations described can occur entirely within a single node 302. The apparatus 300 may thus comprise a single desktop computer or server, for example, or a number of networked nodes 302.

In some embodiments, then, an apparatus 300 may comprise a plurality of nodes 302, one or more of the nodes 302 having an interface 350 to receive an unmarked event 338 (e.g., any one or more of the unmarked events E1, E2, E3, . . . , EN); and at least one processor 320 to transform the unmarked event (e.g., unmarked event E1) into a tainted event (e.g., tainted event E1+TAINT). The unmarked event 338 is transformed into a tainted event by marking the unmarked event 338 with a taint TAINT.

The processor 320 may also operate to mark a prior context PC1 associated with the unmarked event E1, and any subsequent context SC1 . . . SCN linked to the prior context PC1 by the tainted event E1+TAINT or other events, as tainted contexts. In this way, the taint TAINT is propagated between the tainted contexts PC1+TAINT, SC1+TAINT, . . . , SCN+TAINT.

The apparatus may operate to publish a GUI that includes an event horizon. Thus, the apparatus 300 may comprise a display 336 to publish an event horizon as part of a graphical user interface (GUI) 334 executed by a client node (e.g., NODE_N), the event horizon including the tainted event and all other events associated with a linked chain of tainted contexts. Thus, the tainted event and the other events share the taint in common with each other and the tainted contexts.

Sources of events may include servers, clients, storage nodes, hardware circuitry, software applications, etc. Thus, the apparatus 300 may comprise a source of an unmarked event 338, the source (e.g., device 332) comprising at least one of a server, a client, a storage node, hardware circuitry, or an application.

A hardware, firmware, or software real time analysis engine may be included as part of the apparatus. Thus, the apparatus 300 may comprise a real time analysis engine 352 to monitor interaction of subsequent contexts SC1 . . . SCN with the tainted event E1+TAINT.

The apparatus may include an event bus coupled to the real time analysis engine. The event bus 354 can be used in an SEM apparatus 300 as a transport mechanism for events. The event bus 354 may operate independently of the real time analysis engine 352, which can make use of the event bus 354 to receive events.

In some embodiments, events are collected using special connectors (e.g., transport events) and collectors (e.g., the data sinks 346), where the events may be recorded, perhaps in a normalized format. The events 338 can be retrieved from the sinks 346 and put on the event bus 354.

Events may be tainted before being added to the event bus 354, or after being read from it, depending on which stage of the data is selected for processing. For example, using static information, events can be tainted beforehand. With dynamic information, events may be tainted after being read from the bus 354.

Thus, the apparatus 300 may comprise one or more data sinks 346 in a memory (e.g., memory 322 or non-transitory storage medium 348) to record events (e.g., both unmarked events 338 and tainted events, such as event E1+TAINT) in a normalized format. The apparatus 300 may further comprise an event bus 354 to transport events, whether unmarked or tainted, to and from the real time analysis engine 352.

In some embodiments, the apparatus 300 comprises a separate storage device 344. The storage device 344 may comprise a non-transitory medium 348 having volatile memory, non-volatile memory, or a combination of the two.

An SEM system 360 may comprise multiple instances of the apparatus 300. The system 360 might also comprise a cluster of nodes 302, including physical and virtual nodes. It should be noted that any of the nodes 302 may include any one or more of the elements explicitly shown in nodes NODE_1, NODE_2, NODE_3, . . . , NODE_N, in any combination.

The nodes 302 may exist as a device embedded within another structure (e.g., as an embedded device), or as a regular desktop or laptop computer that includes a display 336 to show the activities conducted while nodes 302 are active. Thus, the apparatus 300 may also comprise a display 336 coupled to the nodes 302 to display visible indications of the activities conducted (e.g., login to a website initiated by the device 332) by the nodes 302.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the activities illustrated in FIGS. 1 and 2, respectively. Modules may comprise hardware, software, and firmware, or any combination of these. Additional embodiments may be realized.

Figure 4:
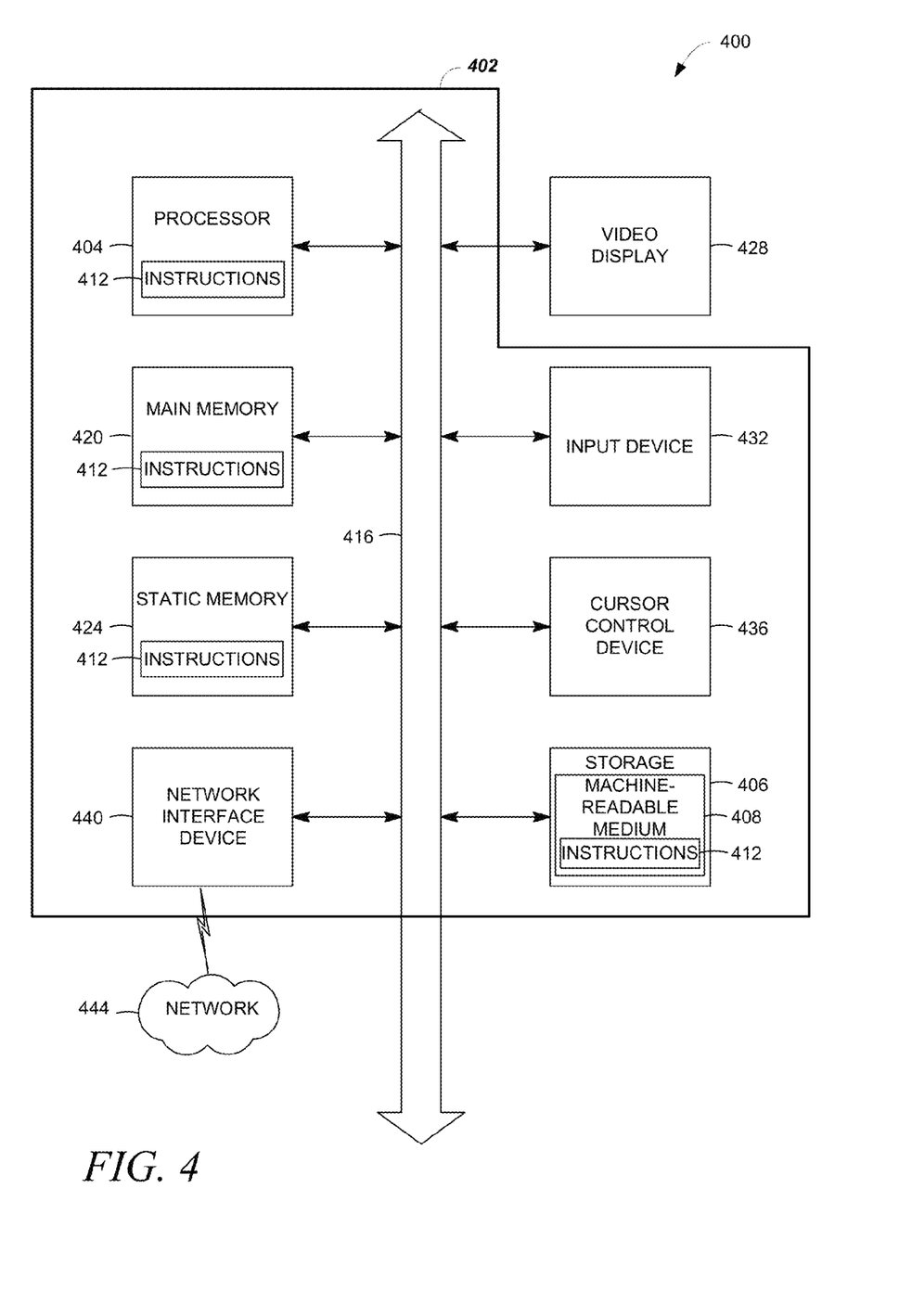
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C#. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any tangible, non-transitory memory including an electrical, optical, or electromagnetic conductor) having instructions 412 stored thereon (e.g., computer program instructions), which when executed by the one or more processors 404 result in the machine 402 performing any of the actions described with respect to the methods outlined above.

The machine 402 may take the form of a specific computer system having a processor 404 coupled to a number of components directly, and/or using a bus 416. Thus, the machine 402 may be similar to or identical to the apparatus 300 or system shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a personal digital assistant (PDA), a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database), and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the various embodiments, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to provide new options for security event management. For example, various embodiments can provide a proactive approach, using events to carry causality relationships between contexts. No particular pattern of information flow is required for useful operation. Taints can now be propagated automatically by events, between contexts, so that malicious activity that has never been observed before can finally be detected—without updating rule sets.

Finally, forensic analysis can be more efficient, since various embodiments can be used to discover the event horizon—with the first tainted event used to find others that might also be tainted. The horizon can be used to enable dynamic views of the interaction between systems. Increased system security, and user satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A system, comprising:
an interface to receive an unmarked event, wherein an event is an action capable of being monitored and recorded within a computer system with one or more corresponding contexts for the event, the one or more corresponding contexts including information about an environment surrounding an interaction between a corresponding event and one or more functions provided by an application at a point-in-time;
at least one processor to:
transform the unmarked event into a tainted event by marking the unmarked event with a taint;
mark the one or more corresponding contexts for the event as tainted contexts using the taint;
mark a prior unmarked context associated with the tainted event with the taint to create a prior tainted context, so as to propagate the taint from the tainted context to the prior tainted context, propagation of the taint being time-limited;
mark any subsequent context linked to the prior tainted context by the tainted event or other events, as subsequent tainted contexts, so as to propagate the taint from the tainted context to the prior tainted context and then to the subsequent tainted contexts, propagation of the taint being time-limited; and
mark any other unmarked event emanating from the tainted contexts, the prior tainted context, or the subsequent tainted contexts as other tainted events with the taint; and
a display to publish an event horizon as part of a graphical user interface (GUI) executed by a client node, the event horizon including the tainted event and all of the other tainted events.

2. The system of claim 1, further comprising a source of the unmarked event, the source comprising at least one of a server, a client, a storage node, hardware circuitry, or an application.

3. The system of claim 1, further comprising:
data sinks in a memory to record the tainted event and at least some of the other events in a normalized format.

4. The system of claim 1, further comprising:
a real time analysis engine to monitor interaction of one of the subsequent contexts with the tainted event.

5. The system of claim 4, further comprising:
an event bus to transport at least one of the tainted event or the other events to and from the real time analysis engine.

6. A processor-implemented method to execute on one or more processors that perform the method, comprising:
receiving an indication that a context associated with a source of an event is malicious, wherein the context includes information about an environment surrounding an interaction between a corresponding event and one or more functions provided by an application at a point-in-time, and wherein the event is an action capable of being monitored and recorded within a computer;
generating a context taint to identify the context as a tainted context that is malicious when the context has not been previously known to be malicious;
transforming the event from an unmarked event to a tainted event by marking the unmarked event with the context taint;
marking a prior unmarked context associated with the tainted event with the taint to create a prior tainted context, so as to propagate the taint from the tainted context to the prior tainted context, propagation of the taint being time-limited;
marking any subsequent context linked to the prior tainted context by the tainted event or other events, as subsequent tainted contexts, so as to propagate the taint from the tainted context, to the prior tainted context, and then to the subsequent tainted contexts, propagation of the taint being time-limited;
marking any other unmarked event emanating from the tainted context, the prior tainted context, or the subsequent tainted contexts as other tainted events with the taint; and
publishing an event horizon to a display, the event horizon including the tainted event and all of the other tainted events.

7. The method of claim 6, further comprising:
determining the source is malicious by matching static characteristics of the source with information in a policy defining malicious sources, the policy established prior to existence of the event.

8. The method of claim 6, further comprising:
determining the source is malicious by matching malicious activity defined in a policy with activity presented by the source.

9. The method of claim 6, wherein the receiving further comprises:
receiving the indication as a message from a software application, with respect to the source being another application compromised by a software virus.

10. The method of claim 6, further comprising:
creating the taint to include a universally unique identifier (UUID) value.

11. The method of claim 6, wherein the transforming further comprises:
applying the taint as a value that travels with the tainted event.

12. The method of claim 6, wherein the marking further comprises:
applying the taint as a value that is associated with the context, the prior context, and the subsequent contexts, wherein the taint is not data to be processed within the context, the prior context, or the subsequent contexts.

13. A processor-implemented method to execute on one or more processors that perform the method, comprising:
receiving an indication that a context associated with a source of an event is malicious, wherein the context includes information about an environment surrounding an interaction between a corresponding event and one or more functions provided by an application at a point-in-time, and wherein the event is an action capable of being monitored and recorded within a computer;
transforming the event from an unmarked event to a tainted event by marking the unmarked event with the context taint;
marking a prior unmarked context associated with the tainted event with the taint to create a prior tainted context, so as to propagate the taint from the tainted context to the prior tainted context, propagation of the taint being time-limited;
transforming any subsequent unmarked contexts into additional tainted contexts in response to identifying the tainted event as a link between the prior tainted context and the subsequent unmarked contexts;
marking any other unmarked event emanating from the prior tainted context and the additional tainted contexts as other tainted events with a common taint; and
publishing an event horizon to a display, the event horizon including the tainted event and all of the other tainted events.

14. The method of claim 13, further comprising:
verifying security assertions from user defined policies associated it the prior tainte context the additional tainted contexts.

15. The method of claim 14, wherein the verifying comprises:
determining whether the taint applied to the tainted event is traveling toward a forbidden destination, or that the taint has reached the forbidden destination.

16. The method of claim 13, further comprising:
blocking interaction of an event with a new context when the event is marked by the taint.

17. The method of claim 13, wherein the transforming further comprises:
transforming the subsequent unmarked contexts into the additional tainted contexts for a time period defined by receiving an indication of manual termination, or by a self-terminating configuration value.

18. The method of claim 13, wherein the transforming further comprises:
transforming the subsequent unmarked contexts into the additional tainted contexts across multiple computer systems without accessing a set of rules defining interactions between the multiple computer systems.

19. The method of claim 14, further comprising:
responding to at least one of the security assertions according to a vulnerability category associated with at least one of the additional tainted contexts.

* * * * *

UNITED STATES PATENT AND TRADEMARK OFFICE
CERTIFICATE OF CORRECTION

PATENT NO. : 9,111,092 B2
APPLICATION NO. : 13/219871
DATED : August 18, 2015
INVENTOR(S) : Apostolescu et al.

It is certified that error appears in the above-identified patent and that said Letters Patent is hereby corrected as shown below:

In the claims

In column 14, line 34, in Claim 14, delete "it" and insert --with--, therefor

In column 14, line 34, in Claim 14, delete "tainte" and insert --tainted--, therefor In column 14, line 34, in Claim 14, before "the", insert --or--, therefor Signed and Sealed this
Twenty-eighth Day of June, 2016

Michelle K. Lee
*Director of the United States Patent and Trademark Office*